United States Patent [19]

Ahrens et al.

[11] 4,367,952
[45] Jan. 11, 1983

[54] CENTERING DEVICE FOR THE MANUFACTURE OF A CENTER HOLE IN DISKS

[75] Inventors: Harald Ahrens; Dieter Schulz, both of Hanover, Fed. Rep. of Germany

[73] Assignee: Polygram GmbH, Fed. Rep. of Germany

[21] Appl. No.: 248,686

[22] Filed: Mar. 30, 1981

[51] Int. Cl.³ .............................................. G01B 11/00
[52] U.S. Cl. ................................... 356/400; 356/363; 356/153
[58] Field of Search ............... 356/138, 153, 354, 356, 356/358, 363, 399, 400; 250/550; 369/54, 58

[56] References Cited

U.S. PATENT DOCUMENTS

| 3,915,576 | 10/1975 | Taylor | 356/172 |
| 4,037,969 | 7/1977 | Feldman et al. | 356/400 |
| 4,155,098 | 5/1979 | Roach et al. | 250/550 |

FOREIGN PATENT DOCUMENTS 1565829  4/1980  United Kingdom .

OTHER PUBLICATIONS

"Series G Optical Scanners", General Scanning Catalog, 1976.

Primary Examiner—R. A. Rosenberger
Attorney, Agent, or Firm—Hill, Van Santen, Steadman, Chiara & Simpson

[57] ABSTRACT

A centering device for the manufacture of a center hole in disks, particularly metallized video disks with spiral information tracks and an information-free center, employs a measuring head for the emission of a light beam onto the disk surface. The light beam is precisely situated at a boundary between the information portion and the information-free portion of the disk during a full disk revolution (a transition criterion) and that said criterion is evaluated for the identification of the center. An electronic control circuit is provided for the control of the displacements required for the measuring head and of the disk centered in planes which are parallel relative to one another.

10 Claims, 9 Drawing Figures

CENTERING DEVICE FOR THE MANUFACTURE OF A CENTER HOLE IN DISKS

BACKGROUND OF THE INVENTION

The invention relates to a centering device for the manufacture of a center hole in disks, particularly metallized video disks, with, for example, spiral information tracks and an information-free center. A measuring head is employed for the emission of a light beam onto the x-y disk plane and for the reception of the radiation picked up by a detector upon exploitation of the light diffraction at the information tracks, whereby the measuring head and the disk to be centered can be displaced relative to one another in parallel planes.

Optically scanned video disks which rotate with a speed of 1500 or, respectively, 1800 rpm exhibit a center hole into which a shaft for rotation is inserted during the play-back operation. If the center hole is not precisely situated in the center of the disk, then an eccentricity of the informational tracks with respect to the axis of rotation would be effected. Slight eccentricity amounts which are smaller than 50 μm can be compensated by the play-back device. Greater eccentricities can exceed the correction capability of the play-back device and, accordingly, can have a negative influence on the play-back.

Due to the high demands made with respect to a slight eccentricity, pressing the center hole in the same work step as the manufacture and duplication of the disks is not possible. The center hole, therefore, must be produced in an additional work step. To this end, a device for centering the disks with high precision is required.

A method and a device for localizing the center of a circular video disk is known from German AS No. 25 38 383, corresponding to U.S. Pat. No. 3,915,576, incorporated herein by reference. There, a light source for the emission of a light beam onto the surface of the disk to be centered and a light receiver for the acceptance of the light beam diffracted by the informational tracks on the disk are provided. The light receiver is disposed in the optical axis of the light source. The video disk is moved in the disc plane situated perpendicular to said optical axis until the light receiver indicates a diffraction maximum. The localization of the center can be determined from said criterion in such manner that the center of the informational tracks is precisely disposed on the optical axis at a diffraction maximum in the light receiver.

However, this known method fails when the disk to be centered exhibits edge defects, since the measurement of the diffraction maximum is falsified in this case due to the light beam striking the edge area of the disk.

SUMMARY OF THE INVENTION

An object of the invention is to eliminate the above disadvantage and to specify a further solution for centering disks in which the diffraction grating property of the informational tracks is exploited.

This object is inventively achieved in that the light beam emitted by the measuring head is focused onto the surface of the disk in the perpendicular beam direction. The disk is rotatably seated in order to be able to execute a rotational movement in the x-y disc plane. The measuring head executes a relative motion in a radial direction with respect to the disk in such manner that the light beam is precisely situated on the boundary between the informational portion and the portion free of information during a full disk rotation (transition or boundary criterion). This criterion is evaluated for the identification of the center.

It is further advantageous that an electronic control circuit driven by the detector with a first control signal is provided. During a disk revolution, the control circuit emits a second control signal derived from the first control signal across a measuring transducer. The second control signal is emitted to a measuring head drive for moving said measuring head. After the disk revolution, the second control signal is evaluated across a measuring transducer for the follow-up of the translational motion of the disk in x-y disk plane.

The advantage achieved with the invention particularly consists of the high measuring precision for identifying the center, namely independently of imprecisions of the edge of the disk. It is thereby guaranteed that the center hole is always punched out precisely at the location provided for this purpose.

DETAILED DESCRIPTION OF THE PREFERRED EMBODIMENTS

Figure 1:
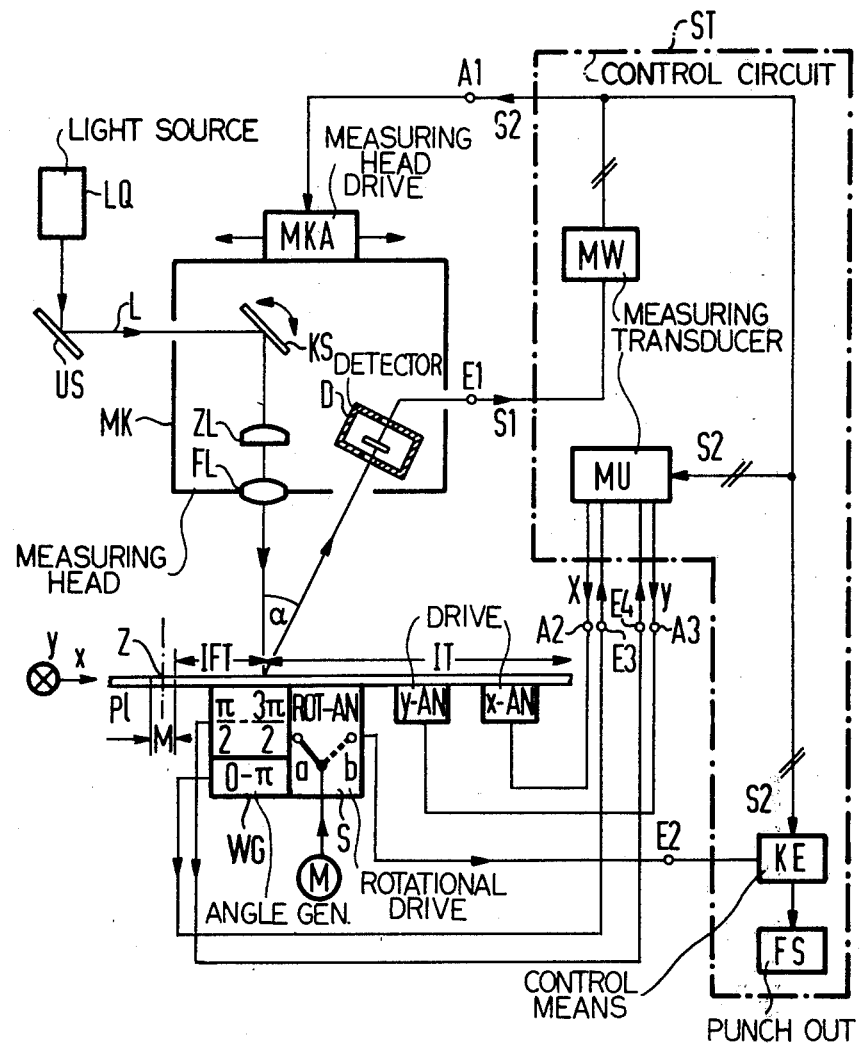
FIG. 1 is a schematic block diagram of a device for centering according to the invention.

The arrangement illustrated in FIG. 1 shows a light source LQ which emits a light beam, preferably a laser beam L. Via a deflection mirror US, the laser beam L arrives at the measuring head MK which exhibits a tilting mirror KS and a lens system in the optical path of the laser beam L. The lens system consists of a focusing lens FL in order to focus the laser beam L in a vertical beam direction onto the surface of the disk P1 to be centered, and further consists of a cylindrical lens ZL by means of which the laser beam L is focused in the shape of a line. The line focusing is executed in order to make the device insensitive to disruptions due to dust and surface damage on the disk. The tilting mirror KS, which is provided in order to facilitate the evaluation, oscillates with a relatively low frequency, so that the light spot is moved back and forth by approximately 200 to 300 μm in a radial direction on the disk P1. Furthermore, the measuring head MK has a detector which, for the purpose of optimum reception of the radiation, is disposed in the direction of a diffraction order of the information tracks functioning as a diffraction grid.

Figure 2:
FIG. 2 is a graph showing the time relationship of the radiation received by the detector given incidence of the light beam on the information-free part of the disk.
Figure 3:
FIG. 3 is a graph showing the time relationship of the radiation received by the detector given incidence of the light beam on the boundary between the information part and the information-free part of the disk.
Figure 4:
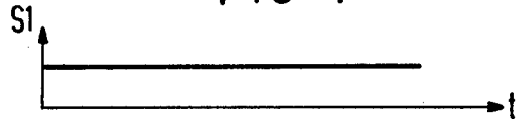
FIG. 4 is a graph showing the time relationship of the radiation received by the detector given incidence of the light beam on the information part of the disk.

FIGS. 2, 3 and 4 show the time relationship of the radiation received by the detector D as a function of the point of incidence of the laser beam L on the disk P1 to be centered.

When picked up on the information-free part IFT, the laser beam L emitted by the measuring head MK is not diffracted, so that the detector D can likewise not receive any radiation in this case, and thus the control signal S1 for driving the control circuit ST exhibits the value 0 (FIG. 2).

In contrast thereto, the laser beam L is diffracted when it strikes the information part IT of a disk P1 provided with information tracks. In this case, the control signal S1 assumes a constant magnitude (FIG. 4). FIG. 3 shows the time relationship of the control signal S1 when the laser beam L is precisely situated on the boundary between the information part IT and the information-free part (IFT).

At the beginning of the measuring operation, the measuring head MK, and thus the laser beam L focused on a disk P1, proceeding from the information-free part IFT, is moved in a radial direction with respect to the disk P1 until the beginning of the information part IT. When the beginning of the information part IT has been found, then the motion of the measuring head MK is controlled in such manner that the focused laser beam L is situated precisely on the boundary between the information part IT and the information-free part IFT during a full disk revolution. An electronic control circuit ST driven by the detector D with the signal S1 is provided for control of the motion of the measuring head MK. The signal S1 at the input E1 of the electronic control circuit ST is converted into the signal S2 across the measuring transducer MW, said signal S2 arriving at the measuring head drive MKA via the output A1 of the electronic control circuit ST, so that the focused laser beam L is held at the boundary between the information part IT and the information-free part IFT during a full revolution.

Figure 5:
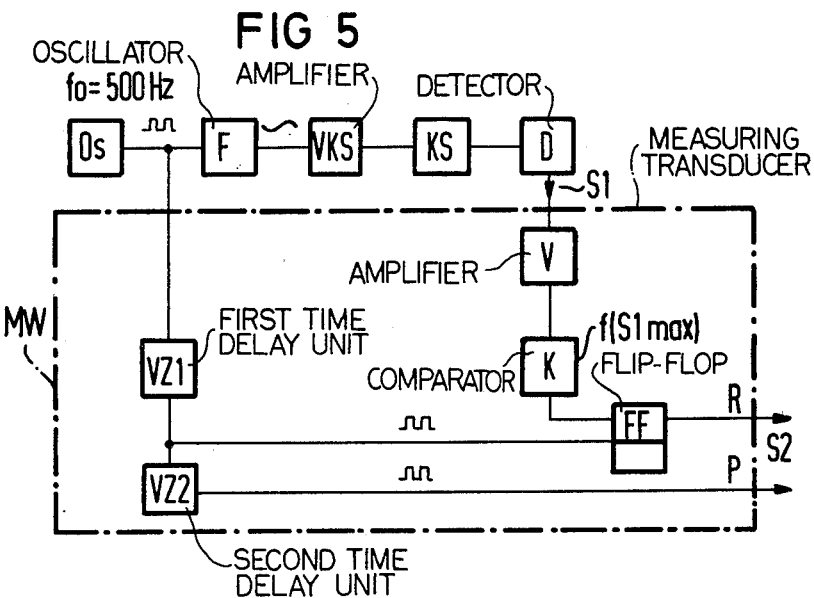
FIG. 5 is a block diagram of a circuit for generating the control signal S2 in the measuring transducer MW.

FIG. 5 shows a detailed block diagram for generating the control signal S2 in the measuring transducer MW for motion of the measuring head MK. For reasons of greater clarity, the precise generation of the control signal S2 is not shown in FIG. 1. As can be derived from FIG. 5, the control signal S2 contains the setting pulse P and the direction signal R for the measuring head drive MKA equipped with a stepping motor with which an incremental feed is generated. In order to derive the directional signal R, the tilting mirror KS is driven via the amplifier VKS with a sine signal arising at the output of the filter F. The resonant frequency of the filter F is identical to the clock frequency $f_o = 500$ Hz emitted by the oscillator Os. Via the optical path, the laser beam L diffracted at the surface of the disk P1 arrives at the detector D whose output signal S1 drives the comparator K via the amplifier V. The switching threshold of the comparator K is a function f of the maximum value of the control signal S1, whereby an identification of the boundary between the information-free part IFT and the information part IT which is independent of disruptive magnitudes such as fluctuations of intensity of the laser or contamination of the disk, is guaranteed.

The signal supplied by the comparator is connected through in proper phase as the directional signal R by means of the oscillator clock in the flip-flop FF delayed in the time-delay unit VZ1.

After the directional signal R has been connected through, the delayed setting pulse P is generated with a second time delay unit VZ2.

Figure 6:
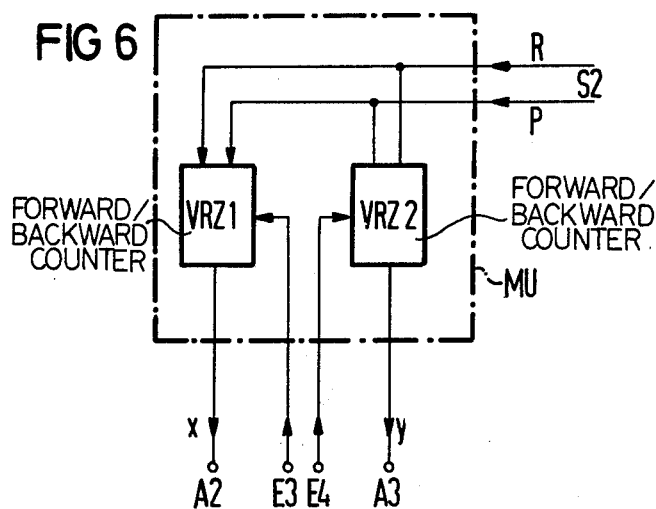
FIG. 6 is a block diagram of the measuring transducer MU.

The control signals S2 emitted to the measuring head drive MKA during a full disk revolution are converted, after the disk revolution, into control commands in a measuring transducer MU for the follow-up of the translational motion of the disk P1 in the x-y disk plane which is necessary for the centering. Thereby, the measuring transducer MU is a unit consisting of two forward/backward counters VRZ1 or, respectively, VRZ2, as can be seen from FIG. 6. The control signal S2, with the respective directional signal R and the setting pulse P, arrives at the input side of both counters VRZ1 and VRZ2. The counter VRZ1 identifies the eccentricity components in the x-direction. The counter VRZ2, accordingly, identifies the eccentricity components in the y-direction. For this purpose, the two counters VRZ1 and VRZ2 are driven by the angle indicator or generator WG via the terminals E3, E4 as a function of the rotational angle $\beta$ of the disk P1.

Figure 7:
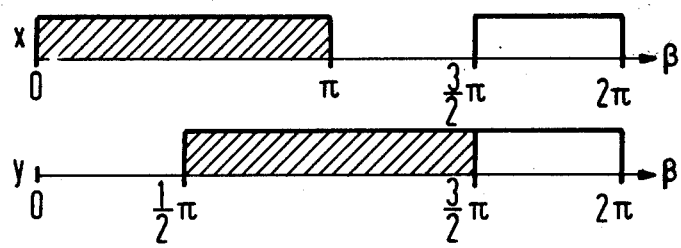
FIG. 7 is a graph showing the manner of functioning of the angle indicator or generator WG.

The manner of functioning of the angle indicator or generator WG is illustrated in FIG. 7. The identification of the eccentricity components in the x-direction ensues in the rotation angle range $0 \leq \beta \leq \pi$ of the disk P1. The identification of the eccentricity components in the y-direction is offset by the angle $\pi/2$ and ensues in the rotational angle range $\pi/2 \leq \beta \leq (3/2) \cdot \pi$ (shaded areas). Thus, the entire identification of the eccentricity values is terminated when the rotational angle $\beta = (3/2) \cdot \pi$ is reached. The actual centering operation, i.e., the follow-up of the translational motion of the disk P1 in the x-y disk plane then ensues in the rotational angle range $(3/2) \cdot \pi \leq \beta \leq 2\pi$. For this purpose, the signal x is emitted by the counter VRZ1 of the measuring transducer MU via the output A2 of the electronic control circuit ST to the drive x-An for motion of the disk in the x-direction and the signal y is emitted via the output A3 to the drive y-An for motion in the y-direction.

The rotary drive ROT-An for the disk P1 controlled by the motor M exhibits a switch S for setting the direction of rotation. In switch position a, the disk P1 executes the full revolution, for example, in a clockwise direction, required given the setting of the focused laser beam at the boundary between the information part IT and the information-free part IFT. In switch position b, the disk P1 is returned to its initial position in the reverse direction of rotation in order to check the centering. The signal S2 measured during said return is supplied to a control means KE which releases the punching-out of the central hole M given a position of the center Z within adjustable tolerance limits.

Figure 8:
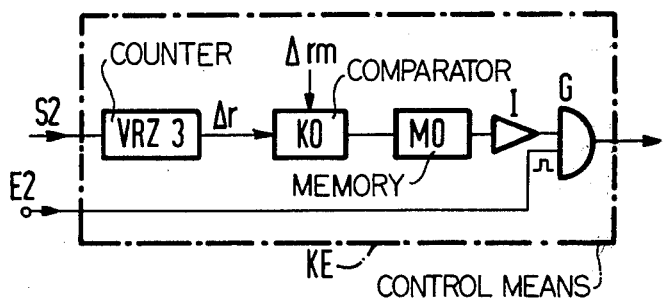
FIG. 8 is a block diagram of the control means KE.

FIG. 8 shows the block diagram of the control means KE. The signal S2 measured during the return arrives at the forward/backward counter VRZ3, which identifies the motion of the measuring head MK in a radial direction $\Delta r$ across the plate P1 which has already been centered. The counter reading $\Delta r$ of the counter VRZ3 which corresponds to the motion of the measuring head MK is continuously compared to a prescribed maximum value $\Delta r_m$ by means of a comparator KO, the tolerance limits being determined by means of said maximum value $\Delta r_m$. A memory MO follows the comparator KO. The memory MO is always set when, during the return of the disk P1, a deviation from the ideal orbit is identified which is greater than a permitted maximum. The signal in the memory MO arrives via the inverter I to the input side of the AND gate G at whose second input the changeover pulse of the switch S arriving via the input E2 always lies during the return. Thus, no signal arises at the output of the AND gate G, whereby the operation "release punch-out" FS is blocked. If, in contrast thereto, the deviation Δr determined during the return of the disk P1 is less than that which is maximally admissible, then the memory MO is not set. A signal which triggers the punch-out operation arises at the output of the control means KE across the inverter I and the AND gate G. The punching device itself is not illustrated in the drawing.

Figure 9:
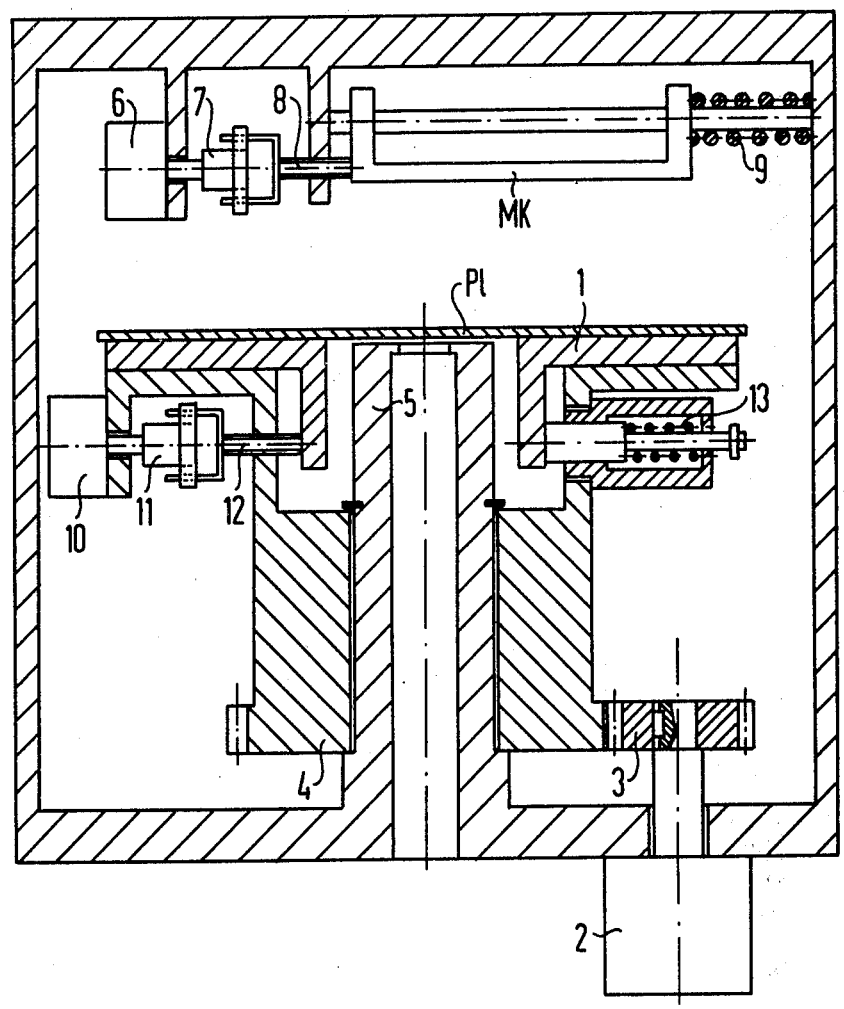
FIG. 9 is a detailed illustration of the measuring head drive MKA, of the rotational drive ROT-An, and of the drives X-An and Y-An.

Circuit blocks MKA, ROT-AN, x-An and Y-An are illustrated in greater detail in FIG. 9. The disk P1 on a vacuum suction lining 1 is turned around the cutting tool 5 by means of the stepping motor 2, pinion 3 and the turntable 4. The vacuum suction lining 1 and the turn table 4 can be mutually displaced in the coordinate direction, but cannot be rotated with respect to one another. The measuring head MK is moved without play against a pressure spring 9 by means of the stepping motor 6, a claw coupling 11 and a threaded spindle 12. Motion in the other coordinate direction occurs in the same manner offset by 90° (not illustrated).

Although various minor modifications may be suggested by those versed in the art, it should be understood that we wish to embody within the scope of the patent warranted hereon, all such embodiments as reasonably and properly come within the scope of my contribution to the art.

We claim as our invention:

1. A centering device for the manufacture of a center hole in disks having spiral informational tracks at an information portion surrounding an information-free center portion, comprising: a measuring head means for emission of a light beam onto an x-y disk plane surface of the disk and which further includes a detector means for reception of radiation occurring through use of a light diffraction characteristic at the informational tracks; displacement means for displacing the measuring head means and the disk to be centered relative to one another in planes which are mutually parallel; said measuring head means focusing the light beam in a substantially perpendicular beam direction onto the surface of the disk; rotating means for rotating the disk in the x-y disk plane; said displacement means displacing the measuring head means relative to the disk in a radial direction in such manner that the light beam is precisely situated on a boundary between the information portion and the information free portion during a full disk revolution; and control circuit means connecting to said measuring head means, displacement means, and rotating means for movement control of the displacement means and rotating means and identification of a center of the disk.

2. A device according to claim 1 wherein said displacement means comprises a measuring head drive means for lateral movement of the measuring head means and disk drive means for lateral movement of the disk of the x-y disk plane; and said control circuit means comprises means for emitting a control signal derived from the detector means to a measuring head drive means during a disk revolution for movement of the measuring head means, a control means including a memory means for storage of said control signal and, measuring transducer means for the tracking of translational motion of the disk of the x-y disk plane by the disk drive means.

3. A device according to claim 2 wherein the control means is connected to said rotating means and control signal for checking centering, said monitoring device means initiating a stamping of a center hole given a position of the center within adjustable tolerance limits.

4. A device according to claim 1 wherein focusing means are provided for focusing the light beam on the surface of the disk in the form of a line.

5. A device according to claim 1 wherein a tilting mirror is disposed in a beam path of the light beam in the measuring head means, said tilting mirror connecting to oscillation means which drive the mirror in an oscillatory motion around its axis of tilt existing in a plane parallel to the x-y disk plane.

6. A device according to claim 1 wherein for optimum reception of radiation, the detector means is disposed in a direction of a diffraction order of the informational tracks functioning as a diffraction grating, said diffraction order indicating an intensity maximum.

7. A device according to claim 1 wherein said control circuit means is driven by the detector means with a first control signal, during a disk revolution said control circuit means emitting a second control signal to a measuring head drive means for moving the measuring head, said second control signal being derived from said first control signal across a first measuring transducer means, and, after a disk revolution, the second control signal being evaluated across a second measuring transducer means for the follow-up of the translational motion of the disk in the x-y disk plane.

8. A video disk centering device for the manufacture of a center hole in metallized video disks having spiral information tracks forming an information portion surrounding an information-free center portion, comprising: measuring head means for emission of a light beam onto a surface of the disk in an x-y plane and for reception of radiation occurring by a light diffraction characteristic at the informational tracks; measuring head drive means for laterally moving the measuring head; lateral drive means for moving the disk in the x-y plane; rotational drive means for rotating the disk within the x-y plane; and control circuit means connected to the measuring head drive means, rotational drive means, lateral disk drive means, and a detected output signal from said measuring head means for positioning the light beam of the measuring head at a boundary between the information portion and information-free portion while rotating the disk, and evaluating resulting output signals from the measuring head after a complete rotation so as to center the disk by use of the x-y drive means and then initiate stamping of the center hole when the control circuit means determines that the disk has been centered.

9. A method for centering a video disk for the manufacture of a center hole, comprising the steps of: providing a measuring head which projects a light beam which is diffracted by spiral information tracks at an information portion of the video disk, said measuring head further including a detector for detecting the diffracted light beam; providing a drive unit to move the measuring head and also drive units for laterally moving the disk in a plane parallel to a plane within which the measuring head is moved; providing a rotational drive for rotating the video disk; utilizing the measuring head to determine a boundary between the information portion of the disk and a central information-free portion of the disk surrounded by the spiral tracks; rotating the disk one full revolution while sensing for the boundary; utilizing resulting output signals from the measuring head to laterally displace the video disk by the drive units so as to center the disk; and when the disk is centered initiating stamping of a centering hole in the disk.

10. A method according to claim 9 further including the step of storing the resulting output signals from the measuring head during the full rotation of the disk and then using the stored signals to position the record by the disk drive units.

* * * * *